United States Patent
Khuat-Duy et al.

(10) Patent No.: US 12,105,721 B2
(45) Date of Patent: Oct. 1, 2024

(54) ENTERPRISE RESOURCE PLANNING SYSTEM, SERVER AND SUPERVISION METHOD OF SQL QUERIES IN SUCH A SYSTEM OR SERVER

(71) Applicant: Ivalua SAS, Massy (FR)

(72) Inventors: Arnaud Khuat-Duy, Massy (FR); Nicolas Souquet, Massy (FR)

(73) Assignee: Ivalua SAS, Massy (FR)

( * ) Notice: Subject to any disclaimer, the term of this patent is extended or adjusted under 35 U.S.C. 154(b) by 209 days.

(21) Appl. No.: 17/497,716

(22) Filed: Oct. 8, 2021

(65) Prior Publication Data

US 2022/0027365 A1    Jan. 27, 2022

Related U.S. Application Data

(63) Continuation of application No. PCT/EP2020/060173, filed on Apr. 9, 2020.

(30) Foreign Application Priority Data

Apr. 10, 2019  (EP) .................................... 19305464

(51) Int. Cl.
G06F 16/2458  (2019.01)
G06F 11/34    (2006.01)
G06Q 10/0631  (2023.01)

(52) U.S. Cl.
CPC ...... *G06F 16/2458* (2019.01); *G06F 11/3495* (2013.01); *G06Q 10/06315* (2013.01)

(58) Field of Classification Search
None
See application file for complete search history.

(56) References Cited

U.S. PATENT DOCUMENTS

| | | | |
|---|---|---|---|
| 8,788,527 B1 * | 7/2014 | Nadel | G06F 16/217 707/791 |
| 10,216,861 B2 * | 2/2019 | Barsness | G06F 16/24561 |
| 2006/0026179 A1 | 2/2006 | Brown et al. | |

(Continued)

OTHER PUBLICATIONS

Akdere M, Çetintemel U, Riondato M, Upfal E, Zdonik SB. Learning-based query performance modeling and prediction. In2012 IEEE 28th International Conference on Data Engineering Apr. 1, 2012 (pp. 390-401). IEEE. (Year: 2012).*

(Continued)

*Primary Examiner* — Uyen T Le
(74) *Attorney, Agent, or Firm* — EIP US LLP

(57) ABSTRACT

An enterprise resource planning system server comprising a SQL database and an executing module to execute an SQL query according to an execution plan to generate execution data relative to the execution of each SQL query; a monitoring module to determine an estimated execution plan metric associated with executing the SQL query according to the execution plan, and to determine whether a hardware performance metric associated with executing the query plan exceeds a hardware performance metric threshold. The monitoring module also determines whether the SQL query is invalid by comparing an execution plan metric associated with executing the execution plan with the estimated execution plan metric in response to determining that the server performance metric exceeds the server performance metric threshold.

16 Claims, 11 Drawing Sheets

(56) References Cited

U.S. PATENT DOCUMENTS

| | | | | |
|---|---|---|---|---|
| 2006/0031200 A1* | 2/2006 | Santosuosso | | G06F 16/24553 |
| 2010/0153431 A1* | 6/2010 | Burger | | G06F 16/2462 |
| | | | | 707/769 |
| 2010/0235349 A1 | 9/2010 | Kuno et al. | | |
| 2010/0325124 A1* | 12/2010 | Wu | | G06F 16/2453 |
| | | | | 707/769 |
| 2012/0023375 A1* | 1/2012 | Dutta | | G06F 11/3409 |
| | | | | 714/E11.179 |
| 2018/0210909 A1* | 7/2018 | Collins | | G06F 16/2456 |
| 2018/0218041 A1* | 8/2018 | Arthanarisamy | | |
| | | | | G06F 16/24542 |
| 2018/0341678 A1* | 11/2018 | Moerkotte | | G06F 16/24545 |
| 2019/0146970 A1* | 5/2019 | Chamieh | | G06F 16/24542 |
| | | | | 707/718 |
| 2020/0117664 A1* | 4/2020 | Kondiles | | G06F 11/1076 |

OTHER PUBLICATIONS

Thiem A, Sattler KU. An integrated approach to performance monitoring for autonomous tuning. In2009 IEEE 25th International Conference on Data Engineering Mar. 29, 2009 (pp. 1671-1678). IEEE. (Year: 2009).*

International Search Report and Written Opinion dated Jun. 2, 2020 for PCT Application No. PCT/EP2020/060173.

European Extended Search report dated Jul. 2, 2019 for EP Application No. EP19305464.0.

* cited by examiner

```
DECLARE @Var1 BIT  ⎫
SET @Var1 = 0      ⎬ 22
......             ⎭

--./ comments      } 23

⎧ SELECT col2
        ⎪ FROM dB
   24 — ⎨ ORDER BY col2 ASC
        ⎩ ......
```

FIG.4

| SQL ID | Executing Plan ID | Star time | Execution time | Progres |
|---|---|---|---|---|
| 000123 | 005 | 14:54:24 | 00:00:48 | 58% |
| 000124 | 004 | 14:54:24 | 00:00:24 | 30% |
| ... | ... | ... | ... | ... |
| ... | | | | |
| ... | | | | |

FIG.6

ENTERPRISE RESOURCE PLANNING SYSTEM, SERVER AND SUPERVISION METHOD OF SQL QUERIES IN SUCH A SYSTEM OR SERVER

CROSS-REFERENCE TO RELATED APPLICATIONS

This application is a continuation of International Application No. PCT/EP2020/060173, filed Apr. 9, 2020 which claims priority to European Application No. EP 19305464.0, filed Apr. 10, 2019, under 35 U.S.C. § 119(a). Each of the above referenced patent applications is incorporated by reference in its entirety.

BACKGROUND OF THE INVENTION

Field of the Invention

Embodiments disclosed herein concern an enterprise resource planning system and/or server and a supervision method of SQL queries in such a system and/or server.

Description of the Related Technology

An enterprise resource planning system, known as an ERP system, is usually used as a business-management system capable to collect, store, manage and interpret data issued from different business activities.

Such a system includes generally a centralized database storing different kinds of data relative to business activities and accessible by the users. The database is implemented for example in the form of a relational database.

As it is known in the state of the art, the access to such a database is commonly implemented using the SQL ("Structured Query Language") programming language.

Particularly, according to SQL, a user wishing to access to the database forms a special query comprising predetermined SQL commands.

In this disclosure, by "user" we understand a person which is able to use the ERP system. Such a person can have different rights of access regarding the system and can for example represent an ordinary user having a restricted number of rights or an administrator having an extended number of rights.

Each query is then executed by an SQL execution module which directly accesses the database in order to obtain the required data.

So, in an ERP system, each user is usually able to form his/her proper queries depending on data needed to be accessed. A user can also modify existing queries in order to obtain this data.

However, it occurs frequently that a user forms or modifies an SQL query with defects. Thus, the queries can be sub-optimum or ill designed.

In this case, despite the defects, the SQL execution module will try to execute the query that can result in some unpredictable consequences.

For example, this can saturate the SQL execution module or more globally, the database so as the other users will not be able to access to the database normally and the operation of the ERP system is degraded.

In some cases, the database can become completely inaccessible such that the ERP system can become completely inoperable.

For example, the query of type SELECT*FROM supplier AS s LEFT JOIN invoice AS i ON i.ID=i.ID is a defective query which can be prejudicial for the ERP system.

Indeed, here the join condition is bogus, instead of having meaningful join condition like i.sID=s.ID, the user used an always true condition resulting in a full cross product of all the lines from both tables which can potentially be lethal to the server.

Moreover, in some cases, invalid SQL queries can be intentionally sent to the database in order to block the operation of the ERP system.

SUMMARY

Embodiments disclosed herein aim to resolve these issues by proposing an ERP system that is able to monitor all of the SQL queries addressed to the database and to identify queries which can degrade the operation of such a system.

According to one aspect there is provided an enterprise resource planning system comprising a server comprising at least one SQL database and an executing module configured to execute an SQL query according to an execution plan to access the SQL database and to generate execution data relative to the execution of each SQL query and at least one user terminal configured to send an SQL query to the executing module of the server. The server further comprises a monitoring module configured to determine an estimated execution plan metric associated with executing the SQL query according to the execution plan; determine whether a hardware performance metric associated with executing the query plan by the executing module exceeds a server performance metric threshold; determine whether the SQL query is invalid by comparing an execution plan metric associated with executing the execution plan by the executing module with the estimated execution plan metric in response to determining that the hardware performance metric exceeds the hardware performance metric threshold.

There is also provided method of supervising SQL queries in an enterprise resource planning system (10), comprising executing an SQL query based on an execution plan to access the SQL database, generating execution data relative to the execution of each SQL query, receiving an SQL query from a user terminal, determining an estimated execution plan metric associated with executing the SQL query according to the execution plan, determining whether a hardware performance metric associated with executing the query plan by the executing module exceeds a hardware performance metric threshold, determining whether the SQL query is invalid by comparing an execution plan metric associated with executing the execution plan by the executing module with the estimated execution plan metric in response to determining that the hardware performance metric exceeds the hardware performance metric threshold.

There is also provided is a server for an enterprise resource planning system, the server comprising at least one SQL database and an executing module configured to execute an SQL query according to an execution plan to access the SQL database and to generate execution data relative to the execution of each SQL query and a monitoring module configured to: determine an estimated execution plan metric associated with executing the SQL query according to the execution plan; determine whether a server performance metric associated with executing the query plan by the executing module exceeds a server performance metric threshold; determine whether the SQL query is invalid by comparing an execution plan metric associated with executing the execution plan by the executing module with the estimated execution plan metric in response to determining that the server performance metric exceeds the server performance metric threshold.

The monitoring module may be configured to execute a first command in response to determining that the SQL query is invalid and to issue a second command in response to determining that the execution plan metric exceeds the estimated execution plan metric by a second larger threshold amount and/or the server performance metric exceeds a second larger server performance metric threshold.

The monitoring module may be configured to determine that the SQL query is invalid in response to determining that the execution plan metric exceeds the estimated execution plan metric by a threshold amount.

The monitoring module is configured to issue an alert in response to determining that the SQL query is invalid and to terminate the SQL query in response to determining that the execution plan metric exceeds the estimated execution plan metric by a second larger amount and/or the server performance metric exceeds a second larger server performance metric threshold.

The hardware performance metric may be based on the execution data relative to the execution of an SQL query and the execution data may comprise at least one data item chosen from the group comprising:
  execution start time of the SQL query;
  current execution time of the SQL query;
  identifier of the user having sent the SQL query;
  identifier of the execution plan used to execute the SQL query;
  part of CPU used by the SQL query;
  memory used by the SQL query;
  disk IOs user by the SQL query;
  executed part of the SQL query; and
  current number of delivered lines by execution of the SQL query.

The analysis of the execution data of each SQL query may comprise comparing the execution data or at least one data item of said execution data with at least one predetermined threshold, the SQL query being determined as invalid when the execution data or the at least one data item exceeds the corresponding threshold.

The hardware metric threshold may be chosen according to the execution plan used to execute the corresponding SQL query.

The analysis of the execution data of each SQL query comprises comparing the current execution time of the SQL query with a first predetermined duration, said SQL query being determined as invalid when said current execution time exceeds the first predetermined duration. The first predetermined duration may be chosen according to the execution plan used to execute the corresponding SQL query.

The monitoring module may be further configured to analyze in real-time an execution context of each SQL query during its execution by the executing module. The execution context may be determined by a functional module from which the corresponding SQL query has been launched and/or may be determined according to user comments presented in the corresponding SQL query.

The server may comprise a supervision module configured to execute a first command in relation with each invalid SQL query. The first command may be chosen from the group comprising:
  sending a feedback message to the user having sent the corresponding invalid SQL query;
  sending a feedback message to an administrator;
  sending a feedback message to the author of the query;
  sending a feedback message to an IT operation team;
  sending a feedback message to a maintenance team;
  killing the corresponding invalid SQL query; and
  killing and banishing the corresponding invalid SQL query.

According to other aspects disclosed herein there is provided a computer program product for supervising SQL queries in an enterprise resource planning system. The computer program product comprises at least one non-transitory computer-readable medium including program instructions that, when executed by a server including at least one processor, cause the server to perform the method described above.

According to another aspect there is provided an enterprise resource planning system comprising:
  a server comprising at least one SQL database and an executing module configured to execute an SQL query according to an execution plan to access the SQL database and to generate execution data relative to the execution of each SQL query; and
  at least one user terminal configured to send an SQL query to the executing module of the server,
  wherein the server further comprises a monitoring module configured to
  determine an estimated execution plan metric associated with executing the SQL query according to the execution plan;
  determine whether a hardware performance metric associated with executing the query plan by the executing module exceeds a server performance metric threshold;
  determine whether the SQL query is invalid by comparing an execution plan metric associated with executing the execution plan by the executing module with the estimated execution plan metric in response to determining that the hardware performance metric exceeds the hardware performance metric threshold.

BRIEF DESCRIPTION OF THE DRAWINGS

The invention and its advantages will be better understood upon reading the following description, which is given solely by way of example and which is made with reference to the appended drawings, in which:

FIG. 4 is a schematic view of an SQL query addressed to the SQL database of FIG. 2;

FIG. 6 is a schematic view of execution data relative to an SQL query used to access to the SQL database of FIG. 2;

DETAILED DESCRIPTION OF CERTAIN INVENTIVE EMBODIMENTS

As used herein, the term "computing device" may refer to one or more electronic devices configured to process data. A computing device may, in some examples, include the necessary components to receive, process, and output data, such as a display, a processor, a memory, an input device, and a network interface. A computing device may be a mobile device, a personal computer, a server computer, or a processor or component thereof.

As used herein, the terms "communication" and "communicate" may refer to the reception, receipt, transmission, transfer, provision, and/or the like, of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

First Embodiment of the Invention

Figure 1:
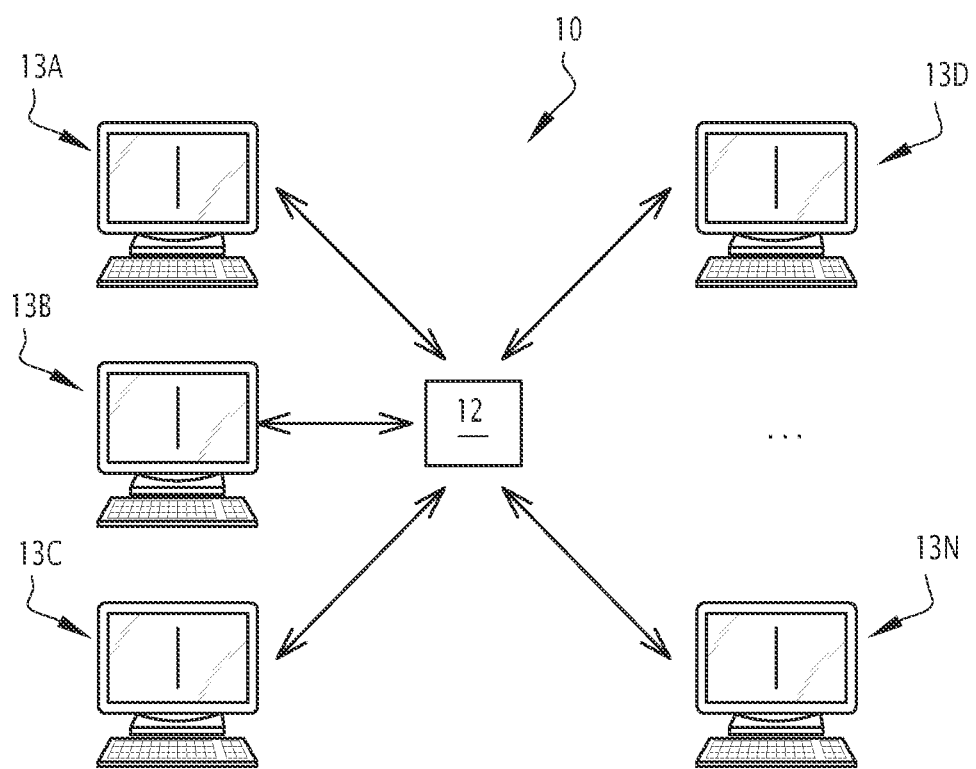
FIG. 1 is a schematic view of an ERP system according to a first embodiment of the invention, the ERP system comprising notably a server.

FIG. 1 illustrates schematically an enterprise resource planning system 10 according to a first embodiment of the invention. This system is denoted in further description as an ERP system 10.

The ERP system 10 is particularly used to carry out one or several business activities, such as suppliers management, human resource, accounting, sales management, production, client management, etc. Each business activity is carried out, for example, by a specific functional module (non-illustrated on FIG. 1) of the ERP system 10.

More generally, each functional module presents a plurality of tools intended to implement a specific functionality, such as a specific business activity, of the ERP system 10.

The business activities are known to those skilled in the art.

In reference to FIG. 1, the ERP system 10 comprises at least one server 12 and a plurality of client terminals 13A, ..., 13N. Each of the server 12 and client terminals 13A, ..., 13N may include a computing device.

Each client terminal 13A, ..., 13N includes, for example, a computer or any other electronic device able to interact with the server 12 via, for example, a computer network.

Particularly, each client terminal 13A, ..., 13N comprises a memory configured to store software programs and at least one processor configured to execute the programs stored in the memory.

At least some programs stored in the memory of each client terminal 13A, ..., 13N make it possible to interact with the server 12.

At least some other programs define at least partially one or several functional modules of the ERP system 10.

Each client terminal 13A, ..., 13N further comprises human-computer interface such as, for example, a display, a keyboard, a mouse, a touchscreen, and/or a sound system.

Particularly, the human-computer interface makes it possible to a user to interact with the corresponding client terminal 13A, ..., 13N to execute, for example, one or several programs stored in the memory of this terminal. One or more graphical user interfaces (GUIs) may be presented on a display for the user to interact with.

The server 12 is in communication with each client terminal 13A, ..., 13N.

Figure 2:
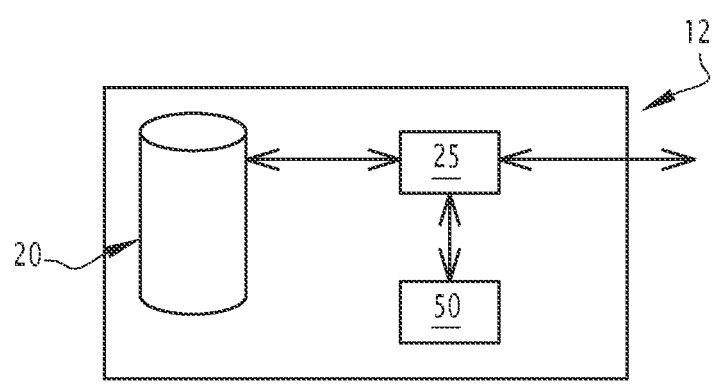
FIG. 2 is a schematic view of the server of FIG. 1, the server comprising an SQL database.

As illustrated on FIG. 2, the server 12 comprises an SQL database 20.

The SQL database 20 contains, for example, data relative to one or several business activities carried out by the ERP system 10.

Particularly, the SQL database 20 comprises, for example, data relative to accounting, suppliers, clients, etc.

The SQL database 20 may include a relational database.

Such a database may include one or more tables, each table being composed with columns and rows. Each row, also called a record, is identified by a unique key. When the database 20 presents several tables, at least some of them can be linked using the keys identifying the rows.

Figure 3:
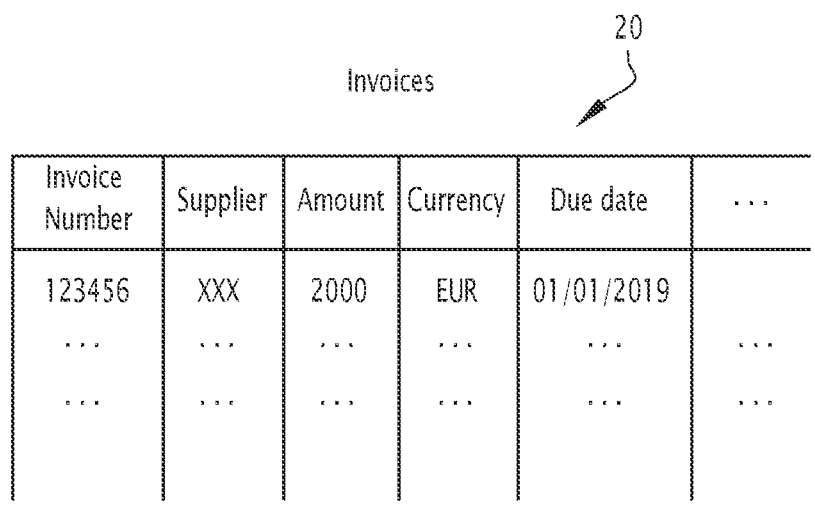
FIG. 3 is a schematic view of an example of a table stored in the SQL database of FIG. 2.

An example of such a database is presented on FIG. 3.

As it is visible on FIG. 3, the database 20 comprises a table called "Invoices" which is composed, for example, of at least five columns called "Invoice number", "Supplier", "Amount", "Currency" and "Due date".

Each record of this example database 20 presents data relative to a supplier invoice which can be uniquely identified in this database using, for example, the invoice number as a unique key.

Another table of the database 20 can be, for example, relative to suppliers and can include, for example, columns called "Address", "Bank account number", "Contact person", etc.

Access to the database 20 is realized using special type of queries called SQL query. Particularly, according to embodiments of the invention, each user terminal 13A, ..., 13N is in communication with the server 20 and is configured to send an SQL query to the server 20 in order to access the SQL database 20.

Each SQL query is generated, for example, by a user via the human-machine interface of the corresponding user terminal 13A, ..., 13B.

Each SQL query presents, for example, a text file edited by the user and comprising a set of commands.

The syntax of these commands is defined by SQL and is recognized by an SQL executing module explained in further detail below. The commands are configured to cause the SQL executing module to perform one or more actions or processes.

An example of an SQL query is presented on FIG. 4.

In the example of this figure, the SQL query comprises a declaration part 22, a comments part 23, and a main body part 24.

Particularly, the declaration part 22 makes it possible to declare variables that can be used in the query.

In the example of FIG. 4, the declaration part 22 declares the variable called "@Var1" of type BIT and associates "0" as initial value to this variable.

The comments part 23 contains user comments which can be, for example, used to facilitate the comprehension of the query.

The comments may be defined by the symbols "- -" or "/*" and "*/", and are ignored by the SQL executing module.

According to the invention, at least some comments of the SQL queries are used to define an execution context of the corresponding SQL query.

The execution context of an SQL query can, for example, be defined by the functional module used to launch this query. Information to identify this functional module or component can be added to the header or comments section of the query and may be used to determine how to handle a query that is considered invalid for running too long for example.

Thus, at least some comments of the SQL queries can contain a name or an identifier of such a functional module.

The main body part 24 comprises principal commands used to access the SQL database 20.

In the example of FIG. 4, the command of type "SELECT" is used.

Particularly, according to this example, the command "SELECT" requests the extraction of the column called "col2" from the table called "db" according to the ascendant order of this column.

Thus, if in the example of FIG. 3, "db" refers to the table "Invoices" and "col2" refers to the column "Supplier", the result of the command "SELECT" of the example of FIG. 4 will be extraction of the whole column "Supplier" and its ordering according to the alphabet order.

In reference to FIG. 2, the server 12 further comprises an executing module 25 configured to execute each SQL query received from the user terminals 13A, . . . , 13N.

Particularly, the executing module 25 includes an SQL engine or manager configured to execute queries according to SQL. The executing module 25 may include a program or software function stored in a memory of the server 12 and executed by one or several processors of the server 12. The executing module 25 may include software, hardware, and/or a combination of software and hardware.

Each SQL query is executed using an execution plan.

Each execution plan, called also query plan, presents a set of steps used by the executing module 25 to access to the SQL database 20. This set of steps presents, for example, a tree structure.

Each execution plan is chosen by the executing module 25 according to the query to be executed.

Particularly, the executing module 25 is configured to optimize the execution of an SQL query by choosing an appropriate execution plan.

For this purpose, the executing module 25 comprises an optimizing unity which is configured to analyze each query and to choose an execution plan among, for example, a plurality of predetermined execution plans, according to this analysis.

Each execution plan can be identified by a unique identifier.

Figure 5:
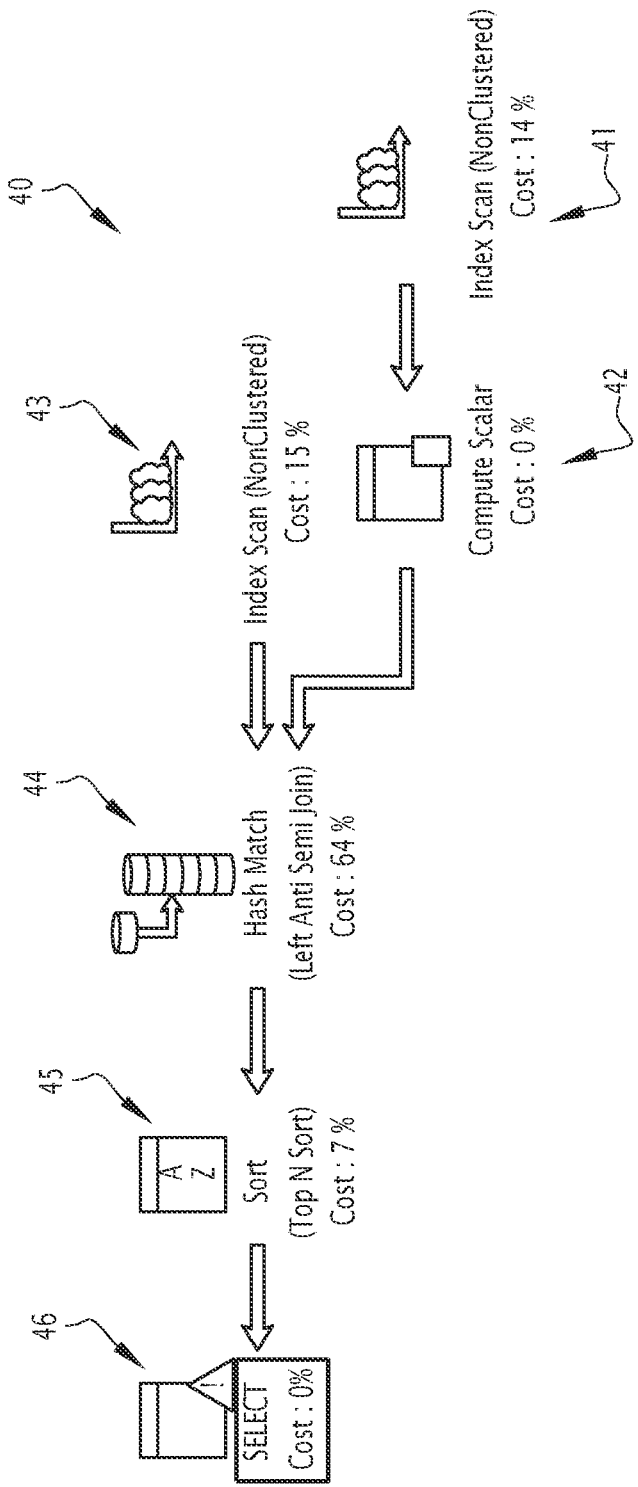
FIG. 5 is a schematic view of an execution plan used to execute an SQL query to access to the SQL database of FIG. 2.

An example of an execution plan 40 is illustrated on FIG. 5.

Thus, as it is illustrated on this FIG. 5, the execution plan 40 comprises steps 41 and 42 called respectfully "Index Scan" and "Compute Scalar", applied to a table of the SQL database 20. These steps 41, 42 are executed in parallel with the step 43, which like the step 41 is also called "Index Scan" but applied, for example, to another table of the SQL database 20.

The execution plan 40 comprises also steps 44, 45 and 46 called respectfully "Hash Match", "Sort" and "SELECT" which are executed consequently after execution of the steps 41 to 43.

Advantageously, each execution plan comprises cost estimation and duration estimation of each one of its steps or each one of its sub-trees in the case where the plan presents a tree structure.

The cost estimation can be expressed in percent and signifies the portion of the total duration or required CPU or disk input/output (read/write) performance for executing the corresponding step.

Thus, in the example of FIG. 5, the costs of the steps 41, 43, 44, and 45 are respectfully equal to 14%, 15%, 64%, and 7%.

Advantageously, each execution plan comprises an estimated number of lines, rows or tuples issued from the database after the execution of an SQL query according to this execution plan.

The estimated number of tuples, cost estimates, duration estimates and other estimated execution plan metrics may be provided by commercially available database management and query software and is typically based on statistical analysis of data distribution within the columns and indexes participating in the execution plan. These statistics are typically collected by a system background process after a certain amount of rows have been affected. The actual execution plan metrics, such as number of tuples generated so far, can also be determined as the execution plan is executed. This information can be determined using query progress indication algorithms and other functionality from commercially available database management and querying software. An example is SQL Server and its execution plan metrics functionality Lightweight Query Profiling which exposes the metrics through system view sys.dm_exec_query_plan_stats.

During the execution of each SQL query, the execution module 25 is able to generate execution data relative to the execution of this query. This data corresponds to hardware or server performance metrics which indicate the resources used by executing the execution plan on the server's hardware. Again, this data can be determined from commercially available database management and querying software. An example in SQL Server are objects called Dynamic Management Views which provide current execution metrics such as duration so far, CPU consumed, I/O's produced so far, RAM granted to the query, space occupied by the query in the transaction log and so on.

The server or hardware performance metrics, such as CPU time used so far in completing the query, therefore relate to measurable properties of the server or other hardware used to execute the query. These measurements are therefore not directly dependent on the execution plan. By contrast, the execution plan metrics are derived from the execution plan itself and are typically based on factors relating to the database and how the execution plan interacts with the data structures as opposed to hardware specific metrics.

Particularly, the execution data relative to the execution of an SQL query comprises at least one data item chosen in the group comprising:
 execution start time of the SQL query;
 current execution time of the SQL query;
 identifier of the user having sent the SQL query;
 identifier of the execution plan used to execute the SQL query;
 part of CPU used by the SQL query;
 memory used by the SQL query;

disk IOs user by the SQL query;
executed part of the SQL query;
current number of delivered lines by execution of the SQL query.

The execution data relative to the execution of each SQL query can be, for example, presented in a table as the table illustrated on FIG. 6.

Thus, in the example of FIG. 6, each line presents execution data for an SQL query identified by the identifier in the column "SQL ID".

The column "Execution Plan ID" corresponds to the identifier of the execution plan used to execute the corresponding SQL query. The columns "Start time" and "Execution time" correspond respectfully to the execution start time and current execution time of the corresponding SQL query. The column "Progress" corresponds to the executed part of the corresponding SQL query expressed in percent.

Of course, many other examples of execution data items are also possible. These examples depend on the type of the executing module 25 used in the server 12.

In this embodiment the server 12 further comprises a monitoring module 50. Like the executing module 25, the monitoring module 50 includes a program or software function stored in a memory of the server 12 and executed by one or several processors of the server 12. The monitoring module 50 may include software, hardware, and/or a combination of software and hardware.

The monitoring module 50 is in communication with the executing module 25 and is configured to analyze in real time each SQL query executed by the executing module 25. Particularly, the monitoring module 50 is configured to analyze in real time the execution plan and the execution data of each SQL query during its execution by the executing module 25 and, according to the analysis, determine as invalid the corresponding SQL query.

The term "invalid SQL query", as used herein, refers to an SQL query which affects the normal operation on the server 12 because, for example, of an unusual amount of disk IOs consumed, more than would be expected for such a query. This may be because the query is improperly formulated or even when it is generated intentionally to affect the normal operation of the server 12. Such situations may arise when more freedom to construct queries is given to users of the database. This compares with systems where queries are restricted to limited selections from a group of query types designed and tested by expert developers. Allowing users to formulate their own queries provides greater flexibility but at the cost of inefficient or defective queries consuming excessive amounts of system resources which may affect other users of the system who could see their query results slow down. This situation may also frustrate non-expert users who may notice their queries taking a long time to return results or not returning results at all. In addition, database administrators (DBAs) may also see many more warnings issued from the system which require their attention to maintain system stability. Such warnings may be that certain queries are consuming a lot of CPU resources and which may require them to more closely analyze it to determine whether the additional resource is reasonable in view of the query itself or to determine that the query has not been properly formulated and to terminate it and send a support message to the user. However if too many such warnings are issued the DBA may become overwhelmed and not be able to manage the queries resulting in reduced system performance and other problems. The embodiments provide improved mechanisms for identifying and handling problematic user queries.

In more detail, the executing module 25 and monitoring modules 50 are configured to carry out an execution and supervision method 100 of SQL queries according to the first embodiment of the invention.

Figure 7:
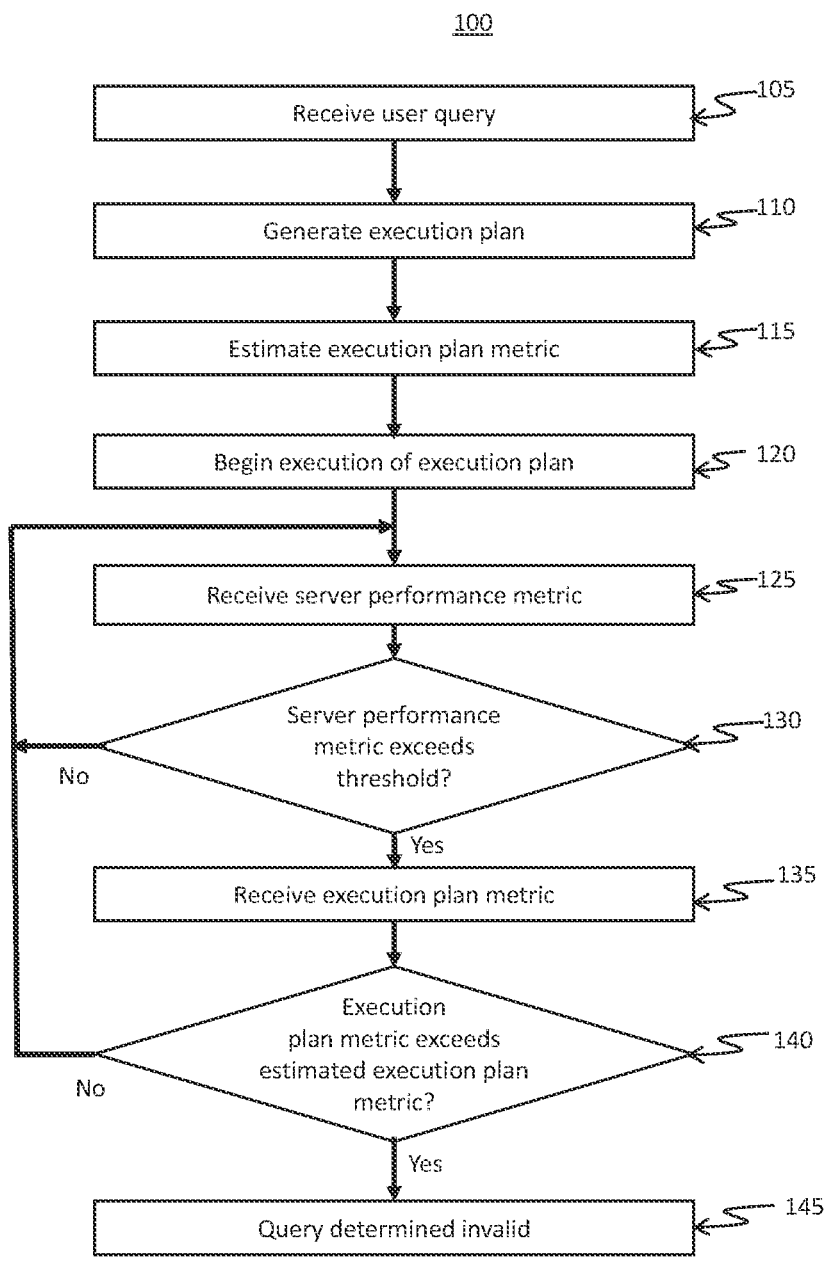
FIG. 7 is a flowchart of a supervision method according to a first embodiment of the invention.

This method will be now described in reference to FIG. 7 presenting a flowchart of its steps.

Initially, it is considered that the ERP system 10 operates normally.

This means that at least some of the user terminals 13A, . . . , 13N send to the server 12 SQL queries.

These queries are received by the server 12 during step 105 and are transmitted to the executing module 25 which executes each of them par example in parallel manner. The execution module 25 generates an execution plan during step 110 and estimates one or more execution plan metrics during step 115. The execution plan metrics may be an estimated number of tuples or an estimated cost parameter.

The steps of the method 100 are executed in real time for each SQL query executed by the executing module 25.

Hence, these steps will be explained in relation with only one SQL query. Execution of the execution plan is started at step 120.

Particularly, during the step 125, the monitoring module 50 receives the execution data or one or more server specific performance metrics. These metrics might include the CPU time used so far to execute the query execution plan, the number of disk input/output operations required so far to execution the execution plan, the amount of memory currently devoted to executing the execution plan and so on.

During the following step 130, the monitoring module 50 determines whether the, each or any server performance metric exceeds a threshold. For example, whether the CPU time exceeds a CPU time threshold and/or the number of disk i/o's exceeds an i/o threshold. The decision can be based on any combination of thresholds exceeded, for example only one, all thresholds or specific combinations. If the decision is negative, that the server specific threshold(s) is not exceeded, then the method returns to receive the next set of server specific performance metrics at step 125. This may be delayed, for example by 1 second so that the performance metrics are checked against the threshold(s) every one second; although other periods could alternatively be used.

If the server performance metric does exceed a threshold then the method receives one or more execution plan metrics during step 135. The server performance metrics may be the number of tuples generated since the beginning of execution of the execution plan. This is then compared with the corresponding estimated execution metric during step 140, the estimated execution metric having been retrieved during step 115. The comparison may be whether the execution plan metric is greater than the estimated execution plan metric or greater than this by a threshold amount.

If the decision is negative, for example that the execution plan metric is not larger than the estimated execution plan metric (e.g. number of tuples), then the method returns to receiving the server performance metrics at step 125. If however the execution plan metric does exceed the estimated execution plan metric then the query is determined to be invalid at step 145.

According to an example, the CPU execution time is first predetermined duration presents a fixed value, for example 1 min.

In this example the analysis also comprises comparing the current number of delivered lines by execution of the SQL query with a threshold.

This threshold can correspond to the estimated number of lines according to the execution plan.

If these two types of thresholds are exceeded, that is the hardware or server performance metric followed by the execution plan metric, the monitoring module 50 indicates that the corresponding query is invalid.

Particularly, during this step 130, the monitoring module 50 associates, for example, a special label to the corresponding SQL query indicating that it is invalid or transmits the ID of this query to other modules of the server 12 to indicate that it is invalid.

Second Embodiment of the Invention

An ERP system according to a second embodiment of the invention will be now explained.

As in the precedent case, the ERP system according to the second embodiment of the invention comprises a plurality of user terminals in communication with a server 212.

The user terminals are identical to the user terminals 13A, ..., 13N and thus, will not be explained in further description.

Figure 8:
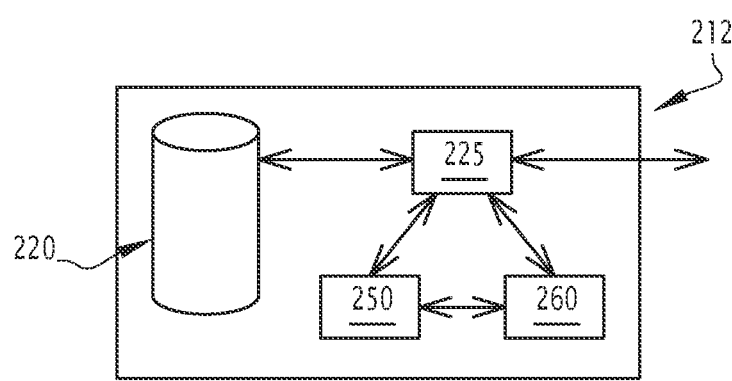
FIG. 8 is a schematic view of a server of an ERP system according to a second embodiment of the invention.

The server 212 is illustrated in detail on FIG. 8.

As it is visible on this figure, the server comprises an SQL database 220, an executing module 225, and a monitoring module 250 similar respectfully to the SQL database 20, the executing module 25, and the monitoring module 50 explained above.

The server 212 of the ERP system according to the second embodiment of the invention further comprises a supervision module 260.

Like the monitoring module 250, the supervision module 260 may include a program or software function stored in the memory of the server 212 and executed by one or several processors of this server 212. The supervision module 260 may include software, hardware, and/or a combination of software and hardware.

The supervision module 260 module is in communication with the monitoring module 250 and is able to receive from this module 250, in real time, information relative to each invalid query while it is being executed by the executing module 225.

Particularly, as it is mentioned in the previous case, this information can be the ID of the invalid query or a special label associated to this query.

The supervision module 260 is further configured to generate a first command in relation with each invalid query and intended to the execution module 225.

According to a particular example of the invention, the first command is chosen in the group comprising:
  sending a feedback message to the user having sent the corresponding invalid SQL query;
  sending a feedback message to an administrator;
  sending a feedback message to the author of the query;
  sending a feedback message to the IT operation team;
  sending a feedback message to the maintenance team;
  killing the corresponding invalid SQL query;
  killing and banishing the corresponding invalid SQL query.

Figure 9:
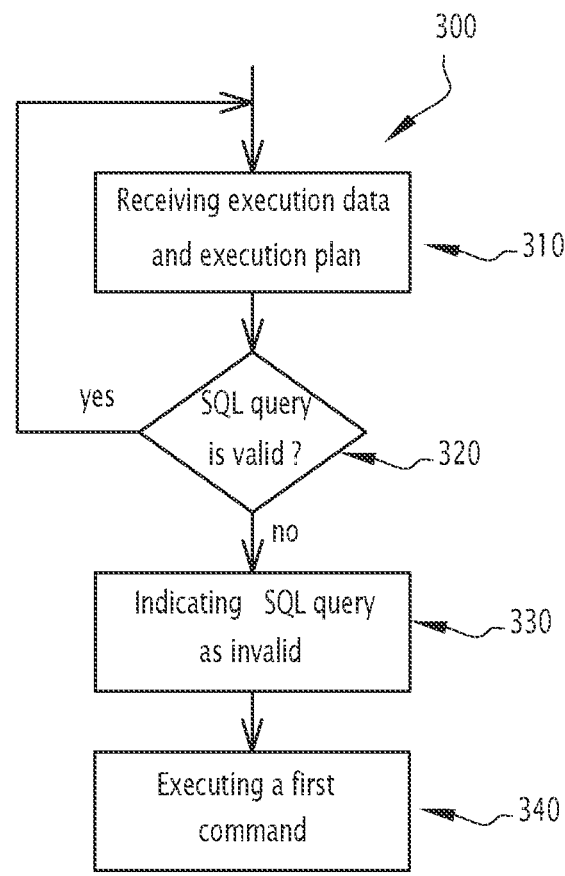
FIG. 9 is a flowchart of a supervision method according to the second embodiment of the invention.

A supervision method of SQL queries 300 according to the second embodiment of the invention will now be explained in reference to FIG. 9 presenting a flowchart of its steps.

This method according to the second embodiment of the invention is carried out by the monitoring module 250 and by the supervision module 260.

Like in the previous case, initially it is considered that the ERP system is normally operated.

Particularly, the user terminals send SQL queries to the server 212 where they are executed by the executing module 225.

Like in the previous case, the following steps of the method will be explained in relation with only one SQL query.

The first three steps 310, 320 and 330 of the method according to the second non-limiting embodiment of the invention correspond with steps 125, 130, 135, 140 and 145 explained above.

Particularly, during the step 310, the monitoring module 250 receives the execution data (server or hardware performance metrics) and the execution plan metrics of the corresponding SQL query.

During the following step 320, the monitoring module 250 analyzes the execution data against a threshold and if exceeded determines whether the execution plan metric is greater than an estimated execution plan metric to determine whether the SQL query is valid or not.

This can be done using comparing with predetermined threshold as explained above.

If the SQL query is valid, the monitoring module 250 passes again to the step 310, otherwise, it passes to the step 330.

During the step 330, the monitoring module 250 indicates that the corresponding query is invalid.

Particularly, during this step 330, the monitoring module 250 transmits information relative to this query to the supervision module 260.

During the step 340, the supervision module 260 executes a command in relation with the invalid query.

Particularly, the supervision module 260 executes a first command which is chosen in the group comprising:
  sending a feedback message to the user having sent the corresponding invalid SQL query;
  sending a feedback message to an administrator;
  killing the corresponding invalid SQL query;
  killing and banishing the corresponding invalid SQL query.

A first command causes sending a feedback message to the user or administrator, such as sending an e-mail message, an SMS or another type of message indicating, for example, the ID of the invalid query and a warning that this query is considered as invalid.

Such a first command can also cause the generating of a log-file or an error message on the user's and administrator's display.

After receiving such a message, the user or the administrator may be able to exert an appropriate action relatively to the invalid query. Hence, according to a particular non-limiting example of the invention, in this case, the user terminal 13A, ..., 13N used by the user or administrator detects such a feedback message and proposes, for example, to the user or administrator to send a "kill" (e.g., terminate) command to the executing module 50.

A first command that causes killing and eventually banishing the invalid SQL query can be realized by sending to the executing module 250 corresponding commands for killing and banishing with the ID of the invalid query.

According to a particular example of the invention, the first command is chosen by the supervision module 260 independently of the corresponding invalid query.

Thus, par example, the supervision module 260 always chooses sending a feedback message or killing the invalid SQL query, independently of this query.

According to another particular example of the invention, the first command is chosen by the supervision module 260 basing on the corresponding invalid query, for example basing on the execution context of this query or the level of the server performance metric and/or execution plan metric. For example a warning message may be sent if the CPU time is above the corresponding threshold but less than a higher second threshold, whereas a termination command may be sent if the CPU time is above the second higher threshold. Similarly a warning message may be sent if the number of tuples generated is more than the estimated number of tuples, but less than a threshold greater than this estimated number. The command may be based on a combination of these factors, for example sending a message to an administrator rather than just to a user when the server performance metric is greater than a third threshold and the execution plan metric is greater than a second threshold more than the estimated execution plan metric.

The first and second commands may also be based on the execution context of the query. This relates to where the query was issued form, for example a particular functional module which issued the query may be identified in the comments section of the query. This context can then be used to determine what actions or commands to take when a query is determined to be invalid or exceeding some metric (performance and/or execution plan). For example a query having an execution context corresponding to a first module of a particular software product may be terminated whereas for the same level of metrics a query issued by a second module of the software product (or a different product) may be allowed to continue, but with a user alert being issued as the first command.

In this case, the supervision module 260 choses, for example, sending a feedback message or killing the invalid SQL query, basing on the execution context of this query.

Third Embodiment of the Invention

An ERP system according to a third embodiment of the invention will be now explained.

As in the precedent cases, the ERP system according to the third embodiment of the invention comprises a plurality of user terminals in communication with a server 412.

The user terminals are identical to the user terminals 13A, . . . , 13N and thus, will not be explained in further description.

Figure 10:
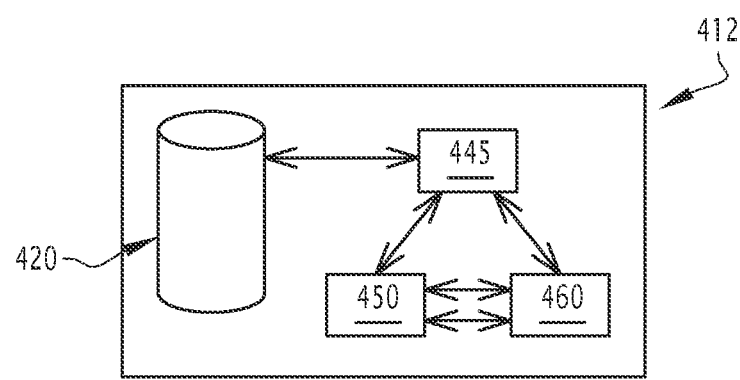
FIG. 10 is a schematic view of a server of an ERP system according to a third non-limiting embodiment of the invention.

The server 412 is illustrated in detail on FIG. 10.

As it is visible on this figure, the server comprises an SQL database 420, an executing module 425, a monitoring module 450, and a supervision module 460, which are respectively similar to the SQL database 220, the execution module 225, the monitoring module 250, and the supervision module 260 explained above.

Like the supervision module 260, the supervision module 460 is configured to generate a first command in relation with each invalid query as it is explained above.

Additionally, the supervision module 460 is also configured to generate a second command after generating a first command for a same invalid query.

This second command can be similar to the first command or different from this command.

Thus, for example, if the first command causes sending a feedback message relative to an invalid SQL query, the second command can cause killing and eventually banishing this query if no action has been made by the user or the administrator.

Figure 11:
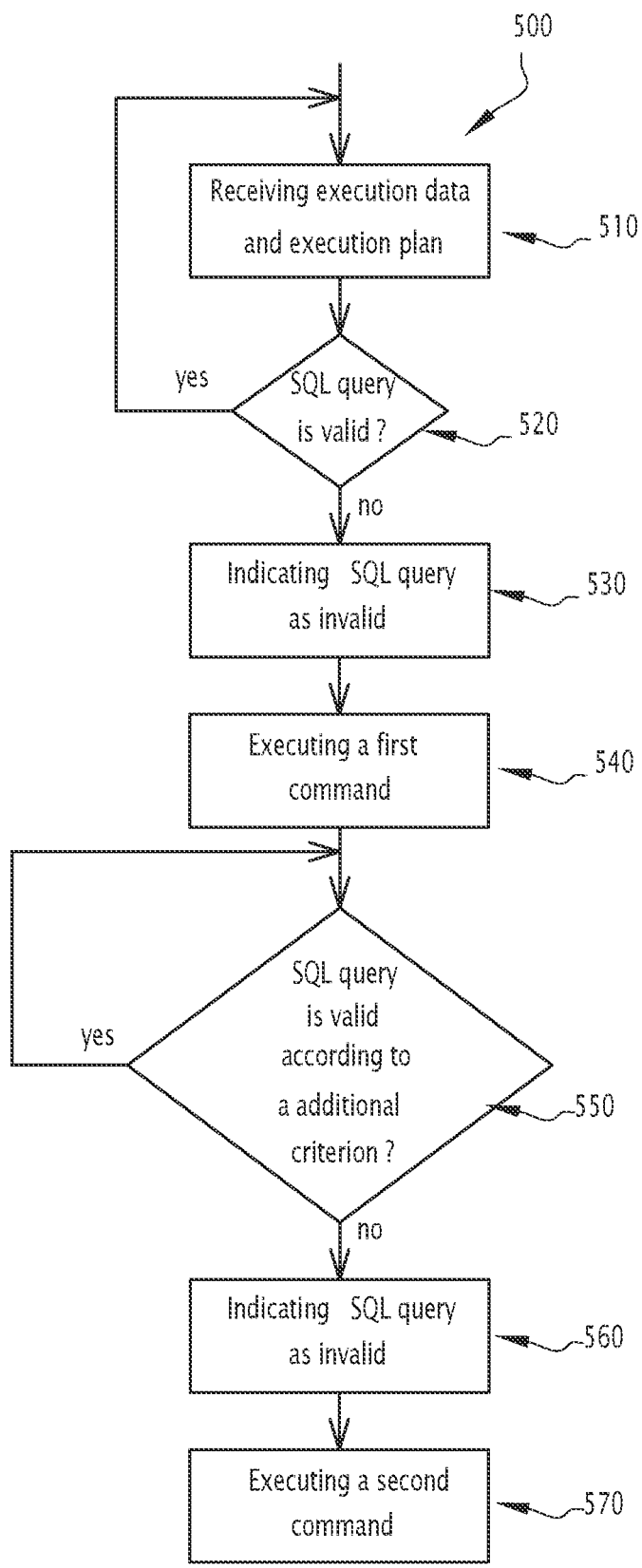
FIG. 11 is a flowchart of a supervision method according to the third embodiment of the invention.

A supervision method of SQL queries 500 according to the third embodiment of the invention will now be explained in reference to FIG. 11 presenting a flowchart of its steps.

This method according to the third embodiment of the invention is carried out by the monitoring module 450 and by the supervision module 460.

Like in the previous case, initially it is considered that the ERP system is normally operated.

Particularly, the user terminals send SQL queries to the server 412 where they are executed by the executing module 425.

Like in the previous case, the following steps of the method will be explained in relation with only one SQL query.

The first three steps 510, 520, and 530 of the method according to the second non-limiting embodiment of the invention are similar to the steps 125, 130, 135, 140 and 145 explained above.

Particularly, during the step 510, the monitoring module 450 receives the hardware performance metric (from the execution data) and the execution plan metric of the corresponding SQL query.

During the following step 520, the monitoring module 450 analyzes the execution data and execution plan metric notably in view of the execution plan to determine whether the SQL query is valid or not.

If the SQL query is valid, the monitoring module 450 passes again to the step 510, otherwise, it passes to the step 530.

During the step 530, the monitoring module 450 indicates that the corresponding query is invalid.

The following step 540 is similar to the step 340 explained above.

Particularly, during this step 540, the supervision module 460 executes a first command in relation with the invalid query.

According to the third embodiment of the invention, this first command consists in sending a feedback message to the user or administrator.

During the following step 550, the invalid query is still being executed by the executing module 425. So, during this step 550, the monitoring module 450 continues to analyze the server or hardware performance metric and/or execution plan metric.

If during this analysis, the monitoring module 450 still considers that the SQL query is invalid according to an additional criterion, it transmits the corresponding information to the supervision module during the step 560.

The additional criterion can also comprise comparing at least one data item of the execution data with a threshold, for example whether the same or a different hardware or server performance metric exceeds a different threshold. This data item can be chosen different from the data item used in the comparing during the step 520 or the same data item. In this last case, the threshold used in this step 550 is different from the threshold used in the step 520.

Thus, for example, if during the analysis of the step 550, the monitoring module 450 determines that the current execution time exceeds a second predetermined duration greater than the first predetermined duration, it considers that the corresponding query is invalid according to the second criterion and transmits this information to the supervision module 460.

The additional criterion can also involve comparing the same or different execution plan metric with the corresponding estimated execution plan metric, for example where originally the actual and estimated number of tuples generated was compared, the additional criterion may involve comparing the actual and estimated cost parameters. Alternatively or additionally the same execution plan metric is used by the additional criterion is that the actual metric exceeds the estimated metric by a larger amount, for example a greater threshold.

According to a particular example of the invention, the second predetermined duration can be equal to 10 min.

During the step 570, the supervision module 460 executes the second command which advantageously causes killing and eventually banishing the corresponding SQL query.

Of course, like in the previous case, this second command can be chosen based on the execution context of the query.

According to another example, the supervision module 460 can execute no command during this step for a certain type of execution context.

Thus, for example, it is possible to imagine an embodiment wherein the supervision module is able to execute n commands (with n>2) in relation with each invalid query before executing the command configured to kill this query.

One can consider that embodiments of the present invention presents numerous advantages.

First of all, embodiments of the invention make it possible to determine SQL invalid queries that can slow down or block the database.

This determination is carried out in real time without human participation using data generally available in the most SQL execution managers or engines. This approach effectively automates part of the administrator function in efficiently managing database query operations by filtering the number of query issues that will be notified to the administrator. This reduces the likelihood that they will be overwhelmed. The approach also allows automation of many administrator tasks further reducing their burden and thereby reducing the impact of poorly constructed user queries on the database system and hence other users. The two step approach to achieving this, based on server or hardware performance metrics and execution plan metrics reduces the number of false positives that would otherwise be generated by using one set of metrics only, or by only using the execution plan metrics to set the hardware or server performance metric thresholds.

When an invalid SQL query is detected, it is possible to warn the user or administrator and eventually to cancel its execution using a kill command automatically.

Thus, the operation of an ERP system can be more reliable.

Embodiments of the invention are particularly useful when an SQL query contains errors, notably syntax errors, or when it is used as a malware.

Although non-limiting embodiments have been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A server for an enterprise resource planning system, the server comprising:
   at least one SQL database and an executing module configured to execute an SQL query according to an execution plan to access the SQL database and to generate execution data relative to the execution of each SQL query; and
   a monitoring module configured to:
   determine an estimated execution plan metric associated with executing the SQL query according to the execution plan, the estimated execution plan metric indicating an estimated number of lines, rows or tuples issued from the SQL database for the SQL query when using the execution plan;
   determine whether a hardware performance metric associated with executing the query plan by the executing module exceeds a hardware performance metric threshold, the hardware performance metric indicating hardware resources used by the server to execute the execution plan;
   in response to determining that the hardware performance metric exceeds the hardware performance metric threshold, determine whether an execution plan metric associated with executing the execution plan by the executing module exceeds the estimated execution plan metric;
   in response to determining that the execution plan metric exceeds the estimated execution plan metric, determine that the SQL query is invalid.

2. The server according to claim 1, wherein the monitoring module is configured to determine that the SQL query is invalid in response to determining that the execution plan metric exceeds the estimated execution plan metric by a threshold amount.

3. The server according to claim 1, wherein the monitoring module is configured to issue an alert in response to determining that the SQL query is invalid and to terminate the SQL query in response to determining that the execution plan metric exceeds the estimated execution plan metric by a second larger threshold amount and/or the hardware performance metric exceeds a second larger hardware performance metric threshold.

4. The server according to claim 1, wherein the hardware performance metric is based on the execution data relative to the execution of an SQL query and the execution data comprises at least one data item chosen from the group comprising:
   execution start time of the SQL query;
   current execution time of the SQL query;
   identifier of the user having sent the SQL query;
   identifier of the execution plan used to execute the SQL query;
   part of CPU used by the SQL query;
   memory used by the SQL query;
   disk IOs user by the SQL query;
   executed part of the SQL query; and
   current number of delivered lines by execution of the SQL query.

5. The server according to claim 1, wherein said hardware performance metric threshold is chosen according to the execution plan used to execute the corresponding SQL query.

6. The server according to claim 1, wherein the monitoring module is further configured to analyze in real-time an execution context of each SQL query during its execution by the executing module.

7. The server according to claim 6, wherein the execution context is determined by a functional module from which the corresponding SQL query has been launched.

8. The server according to claim 6, wherein the execution context is determined according to user comments presented in the corresponding SQL query.

9. The server according to claim 1, wherein the server comprises a supervision module configured to execute a first command in relation to an invalid SQL query and the first command is chosen in the group comprising:
- sending a feedback message to the user having sent the corresponding invalid SQL query;
- sending a feedback message to an administrator;
- sending a feedback message to the author of the query;
- sending a feedback message to an IT operation team;
- sending a feedback message to a maintenance team;
- killing the corresponding invalid SQL query; and
- killing and banishing the corresponding invalid SQL query.

10. A method of supervising SQL queries in an enterprise resource planning system, comprising:
- executing an SQL query based on an execution plan to access the SQL database;
- generating execution data relative to the execution of each SQL query;
- receiving an SQL query from a user terminal;
- determine an estimated execution plan metric associated with executing the SQL query according to the execution plan, the estimated execution plan metric indicating the number of lines, rows or tuples issued from the SQL database for the SQL query when using the execution plan;
- determining whether a hardware performance metric associated with executing the query plan exceeds a hardware performance metric threshold, the hardware performance metric indicating hardware resources used to execute the execution plan;
- in response to determining that the hardware performance metric exceeds the hardware performance metric threshold, determining whether an execution plan metric associated with executing the execution plan exceeds the estimated execution plan metric;
- in response to determining the execution plan metric exceeds the estimated execution plan metric, determine that the SQL query is invalid.

11. The method according to claim 10, wherein determining that the SQL query is invalid comprises determining that the execution plan metric exceeds the estimated execution plan metric by a threshold amount.

12. The method according to claim 10, comprising executing a first command in response to determining that the SQL query is invalid and issuing a second command in response to determining that the execution plan metric exceeds the estimated execution plan metric by a second larger threshold amount and/or the hardware performance metric exceeds a second larger hardware performance metric threshold.

13. The method according to claim 12 wherein the first command is to issue and alert and the second command is to terminate execution of the SQL query.

14. An enterprise resource planning system comprising a server comprising:
- at least one SQL database and an executing module configured to execute an SQL query according to an execution plan to access the SQL database and to generate execution data relative to the execution of each SQL query; and
- a monitoring module configured to:
- determine an estimated execution plan metric associated with executing the SQL query according to the execution plan, the estimated execution plan metric indicating the number of lines, rows or tuples issued from the SQL database for the SQL query when using the execution plan;
- determine whether a hardware performance metric associated with executing the query plan by the executing module exceeds a hardware performance metric threshold, the hardware performance metric indicating hardware resources used to execute the execution plan;
- in response to determining that the hardware performance metric exceeds the hardware performance metric threshold, determine whether an execution plan metric associated with executing the execution plan by the executing module exceeds the estimated execution plan metric;
- in response to determining that the execution plan metric exceeds the estimated execution plan metric, determine that the SQL query is invalid.

15. The enterprise resource planning system according to claim 14, wherein the monitoring module is configured to executing a first command in response to determining that the SQL query is invalid and to issue a second command in response to determining that the execution plan metric exceeds the estimated execution plan metric by a second larger threshold amount and/or the hardware performance metric exceeds a second larger hardware performance metric threshold.

16. The enterprise resource planning system according to claim 14, comprising at least one user terminal configured to send an SQL query to the executing module of the server.

* * * * *